No. 730,104. PATENTED JUNE 2, 1903.
F. J. FERGUSON.
DOUGH DIVIDING MACHINE.
APPLICATION FILED JUNE 19, 1902.
NO MODEL.
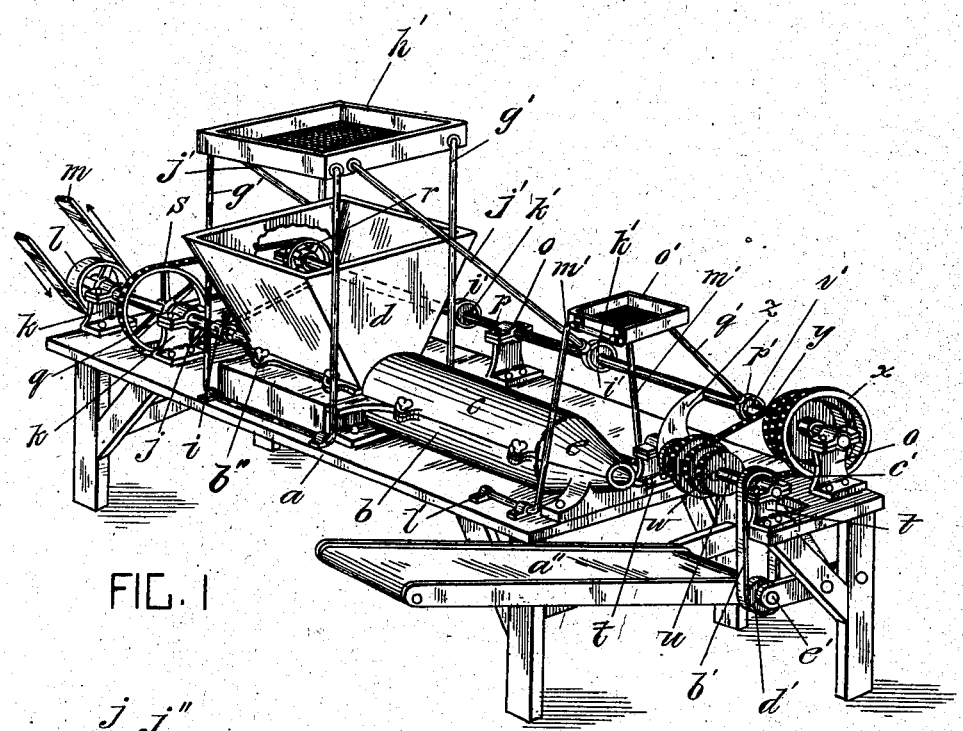
FIG. 1
FIG. 3
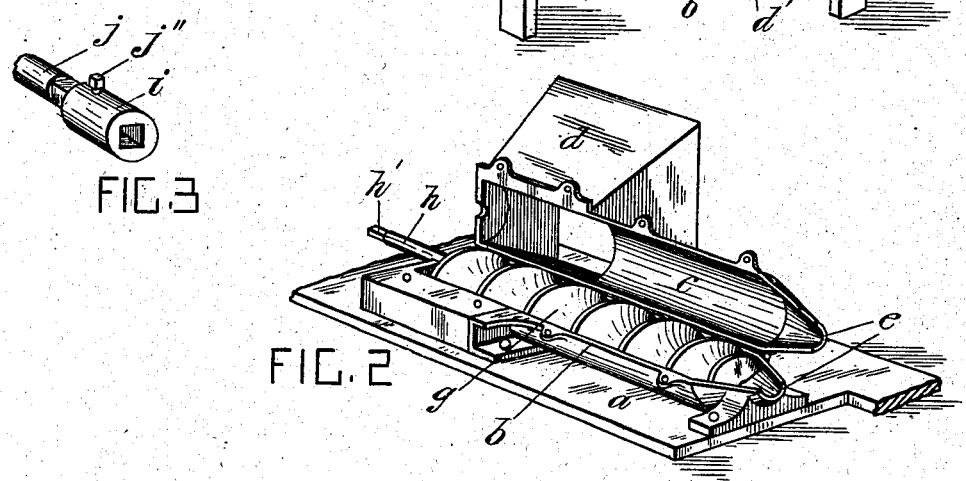
FIG. 2
Witnesses
Inventor
F. J. Ferguson
his Attorney No. 730,104. Patented June 2, 1903.

UNITED STATES PATENT OFFICE.

FRANCIS JOHN FERGUSON, OF TORONTO, CANADA.

DOUGH-DIVIDING MACHINE.

SPECIFICATION forming part of Letters Patent No. 730,104, dated June 2, 1903.

Application filed June 19, 1902. Serial No. 112,362. (No model.)

*To all whom it may concern:*

Be it known that I, FRANCIS JOHN FERGUSON, of the city of Toronto, in the county of York and Province of Ontario, Canada, have invented certain new and useful Improvements in Dough-Dividing Machines; and I hereby declare that the following is a full, clear, and exact description of the same.

This invention relates to a machine which will automatically mold a mass of unformed dough into a predetermined shape and divide it into lumps of a predetermined size, and consequently of a predetermined weight, and to so arrange the parts of the machine that they can be easily and quickly separated for cleaning and other purposes and as easily and quickly assembled again; and the invention consists, essentially, of the device hereinafter more fully set forth, and more particularly pointed out in the claims.

In the drawings, Figure 1 is a perspective view of the entire machine. Fig. 2 is a perspective view of the worm-cylinder, showing the sections separated. Fig. 3 is a perspective view of the socket for connecting the worm-mandrel to the pulley-shaft.

Like letters of reference refer to like parts throughout the specification and drawings.

Mounted on the frame $a$ is the worm-cylinder, consisting of a stationary section $b$, rigidly bolted or otherwise fastened to the frame $a$, and a movable section $c$, hinged to the section $b$ at one side thereof and fastened at the other side by means of bolts $b''$. The sections $b$ and $c$ at the delivery end of the worm-cylinder are arranged to form a mold $e$ to mold the dough into the requisite shape as it is ejected therefrom by the action of the worm. It is not absolutely necessary to make the worm-cylinder in separable sections, although it is preferable to do so for cleaning and other purposes, the most convenient arrangement being to divide the worm-cylinder and mold longitudinally, as shown in Fig. 2 of the drawings, and fasten the sections together when closed by means of bolts easily operated by hand or tool. Rotatable in the worm-cylinder is a worm or screw $g$, the external diameter of which corresponds to the internal diameter of the worm-cylinder, forming a contact therewith to prevent the dough getting between the periphery of the convolutions of the worm and the internal face of the worm-cylinder. Projecting from the hopper end of the worm $g$ is a mandrel $h$, the end $h'$ of which is shaped to enter a correspondingly-shaped socket $i$, movable on the pulley-shaft $j$ and locked thereto by means of a set-screw $j''$. The pulley-shaft $j$ is journaled in bearings $k$, mounted on the frame $a$ contiguous to the hopper end of the worm-cylinder, and rigidly mounted on the pulley-shaft is the driving-pulley $l$, by means of which motion is transmitted from the main counter-shaft to the pulley-shaft and worm by the driving-belt $m$. The socket $i$ by being longitudinally movable on the pulley-shaft allows of the separation of the mandrel therefrom without displacing the pulley-shaft when it is necessary to remove the worm from the worm-cylinder and when replacing it therein and recoupling the mandrel to the pulley-shaft to revolve unitedly therewith.

Mounted in bearings $o$, rigidly connected to the frame, is an auxiliary counter-shaft $p$, and rigidly mounted on the pulley-shaft $j$ and on the auxiliary counter-shaft $p$ are alining sprocket-wheels $q$ and $r$, respectively, around which passes a sprocket-chain S to cause the united revolution of the auxiliary counter-shaft with the pulley-shaft and at the same relative rate of speed as the worm $g$, the speed of which may from time to time vary according to the quantity and consistency of the dough passing through the worm-cylinder. Rigidly mounted on the frame $a$ at the delivery end of the worm-cylinder are stationary bearings $t$, in which is journaled the divider-shaft $u$, and mounted on the divider-shaft $u$ are variable sprocket-wheels $w$, alining with corresponding sprocket-wheels $x$, mounted on the counter-shaft $p$, and around which passes a sprocket-chain $y$ to cause the revolution of the divider-shaft with the counter-shaft, the purpose of the variable sprocket-wheels being to respectively increase or decrease the speed of the revolution of the divider-shaft. Rigidly mounted on the divider-shaft is the divider $z$, opposed to the delivery end of the worm-cylinder and practically contacting the same during its revolution with the divider-shaft. The dough is fed to the hopper $d$ and passes therefrom to the worm-cylinder, where it is engaged by the worm $g$ and worked to the delivery end thereof under a constant pressure sufficient to insure a regular, constant, and continuously equal ejection of the dough from the mold. Coincident with the rotation of the worm is the action of the divider $z$, which passes across the face of the delivery end of the mold at regular intervals to divide the dough into lumps or pieces of equal sizes, these pieces as they are divided being received by a carrier $a''$, located convenient to the delivery end of the mold and driven by a belt $b'$, passing around a pulley $c'$, mounted on the divider-shaft, and around a pulley $d'$, mounted on the carrier-shaft $e'$. The carrier $a''$ conveys the divided dough to the place of delivery to the pans or oven.

Oscillatingly connected to the main frame $a$ at the sides of the hopper are rocker-arms $g'$, supporting a flour-sifter $h'$ above the hopper, and connected to the flour-sifter $h'$ and to the eccentric-straps $i'$ are the pitmen $j'$. Mounted on the counter-shaft $p$ and working in the eccentric-straps $i'$ are the eccentrics $k'$, by means of which a rocking or oscillating motion is imparted to the flour-sifter during the revolution of the counter-shaft $p$. Connected to the main frame $a$ and located at the side of the mold are bearings $l'$, in which are journaled the ends of the rocker-arms $m'$, supporting above the divider-knife a flour-sifter $o'$, to which and to an eccentric-strap $p'$ is connected a pitman $q'$. Rigidly mounted on the counter-shaft $p$ and working within the eccentric-strap $p'$ is an eccentric $r'$, by means of which an oscillating motion is transmitted to the sifter $o'$ from the counter-shaft $p$, the purpose of the flour-sifters $h'$ and $o'$ being to sprinkle flour on the dough as it is fed from the hopper to the worm and from the mold to the divider, respectively, to prevent the dough adhering to the worm and divider.

By means of a machine constructed on this principle the dough can be expeditiously, accurately, and automatically divided into lumps of a regular size, and consequently of an even weight, and by means of the variable sprocket-wheels on the divider and counter shafts the relative speed of the divider-shaft to the counter-shaft can be respectively increased or decreased as required to respectively increase or decrease the size of the loaves.

Having thus fully described my invention, what I claim as new, and desire to secure by Letters Patent, is—

1. In a dough-dividing machine, the combination of a worm-cylinder, a worm rotatable therein, a shaft carrying the worm, mechanism for rotating said shaft, a mold for the end of the worm-cylinder, a rotating divider opposed to the end of the mold, another shaft for imparting motion to the rotating divider, mechanism connected with the first-mentioned shaft and the last shaft for causing the simultaneous rotation thereof, sifters one above the entrance end of the worm-cylinder and another at the exit end thereof, and mechanism connected to the last-mentioned shaft adapted to receive motion from the shaft and reciprocate the sifters.

2. In a dough-dividing machine the combination of a worm-cylinder having at one end a hopper for feeding the dough thereto and at the other end a mold to shape the dough as it is ejected therefrom, a worm rotatable in the worm-cylinder to convey the dough from the hopper and eject it from the mold means for rotating the worm within the worm-cylinder, a rotatable divider opposed to the delivery end of the mold, means for causing it to rotate relatively to the rotation of the worm, flour-sifters supported above the mold and hopper, and means for rocking the flour-sifters actuated by the same mechanism that operates the divider, substantially as specified.

3. In a dough-dividing machine the combination of a worm-cylinder having at one end a hopper for feeding the dough thereto and at the other end a mold to shape the dough as it is ejected therefrom, a worm rotatable in the worm-cylinder to convey the dough from the hopper and eject it from the mold, a mandrel for the worm, a pulley-shaft, means for detachably connecting the mandrel to the pulley-shaft, a counter-shaft means for transmitting motion from the pulley-shaft to the counter-shaft, a divider-shaft, means for transmitting motion from the counter-shaft to the divider-shaft, a divider mounted on the divider-shaft opposed to the delivery end of the mold flour-sifters supported above the hopper and mold, and means for oscillatingly actuating the flour-sifters from the counter-shaft, substantially as specified.

4. In a dough-dividing machine the combination of a worm-cylinder having at one end a hopper for feeding the dough thereto and at the other end a mold to shape the dough as it is ejected therefrom, a worm rotatable in the worm-cylinder to convey the dough from the hopper and eject it from the mold, a mandrel for the worm, a pulley-shaft, means for detachably connecting the mandrel to the pulley-shaft, a counter-shaft, means for transmitting motion from the pulley-shaft to the counter-shaft, a divider-shaft, means for transmitting motion from the counter-shaft to the divider-shaft, and a divider mounted on the divider-shaft opposed to the delivery end of the mold, substantially as specified.

Toronto, June 16, A. D. 1902.

FRANCIS JOHN FERGUSON.

In presence of—
L. F. BROCK,
F. B. JARMAN.